W. D. Seal,
Compressing Air.
No. 104,362. Patented June 14, 1870.
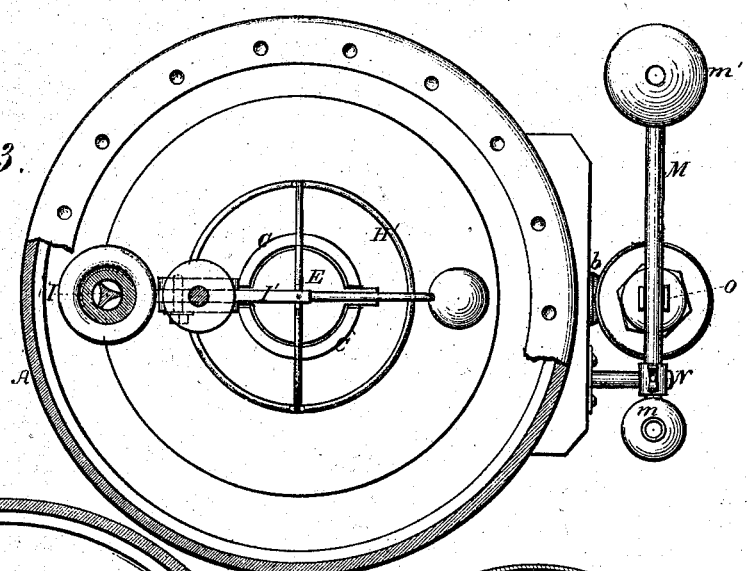
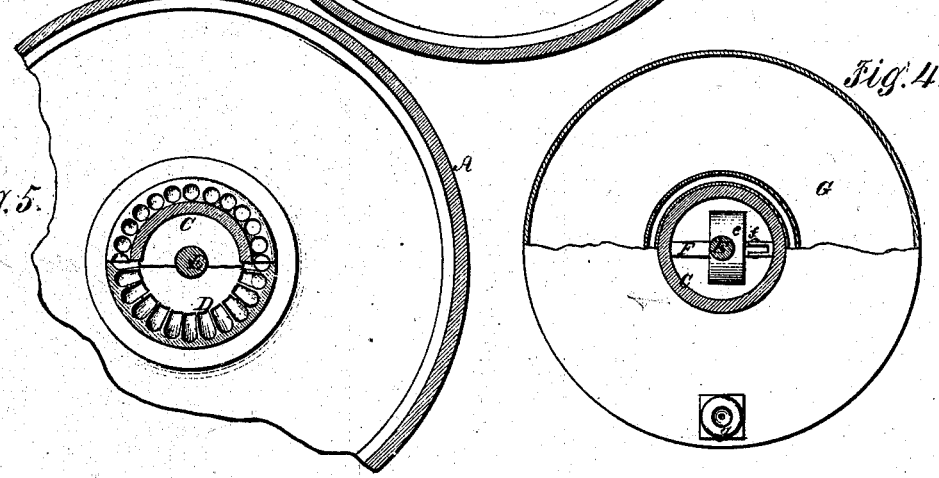
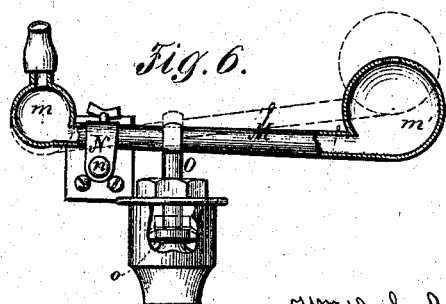
Witnesses:
Fred. Artos.
Jos. L. Peyton.
Wm. D. Seal,
by his atty
Wm. D. Baldwin

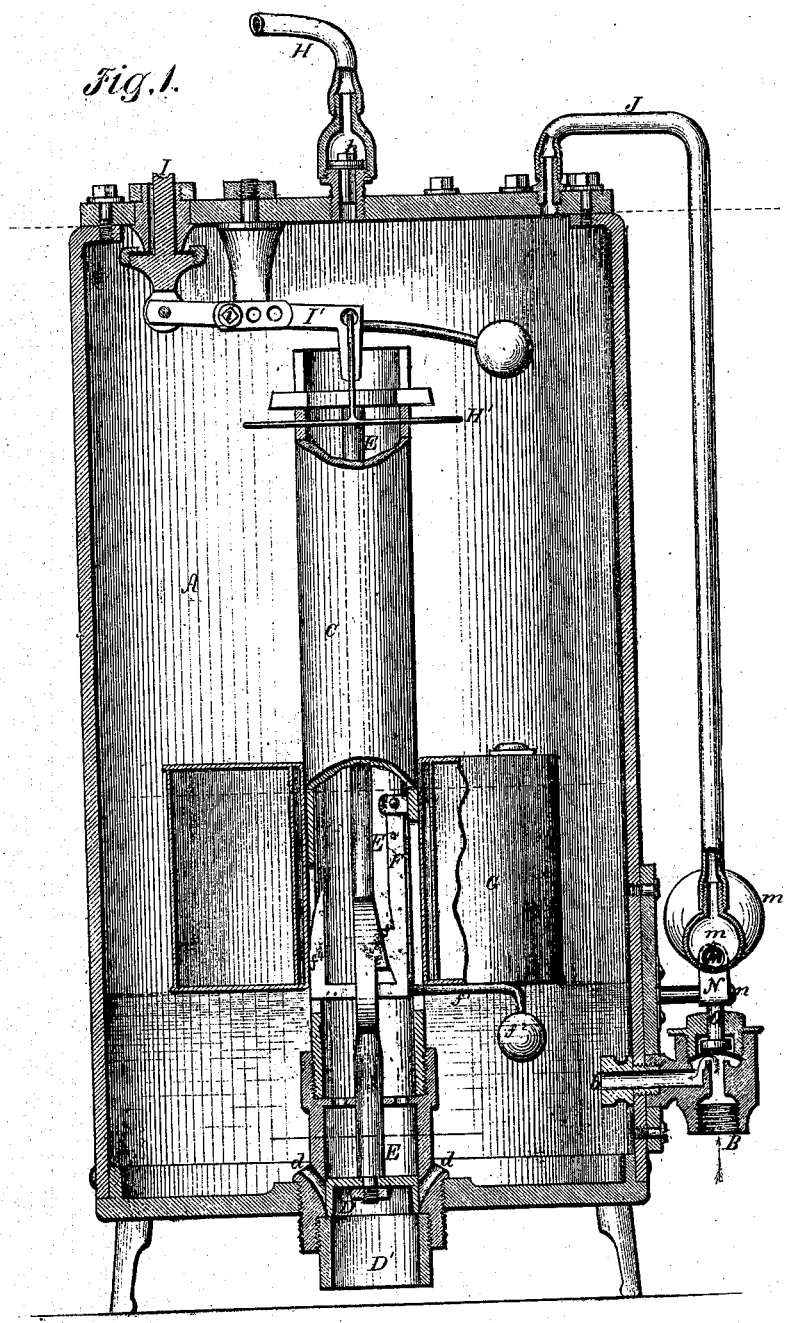

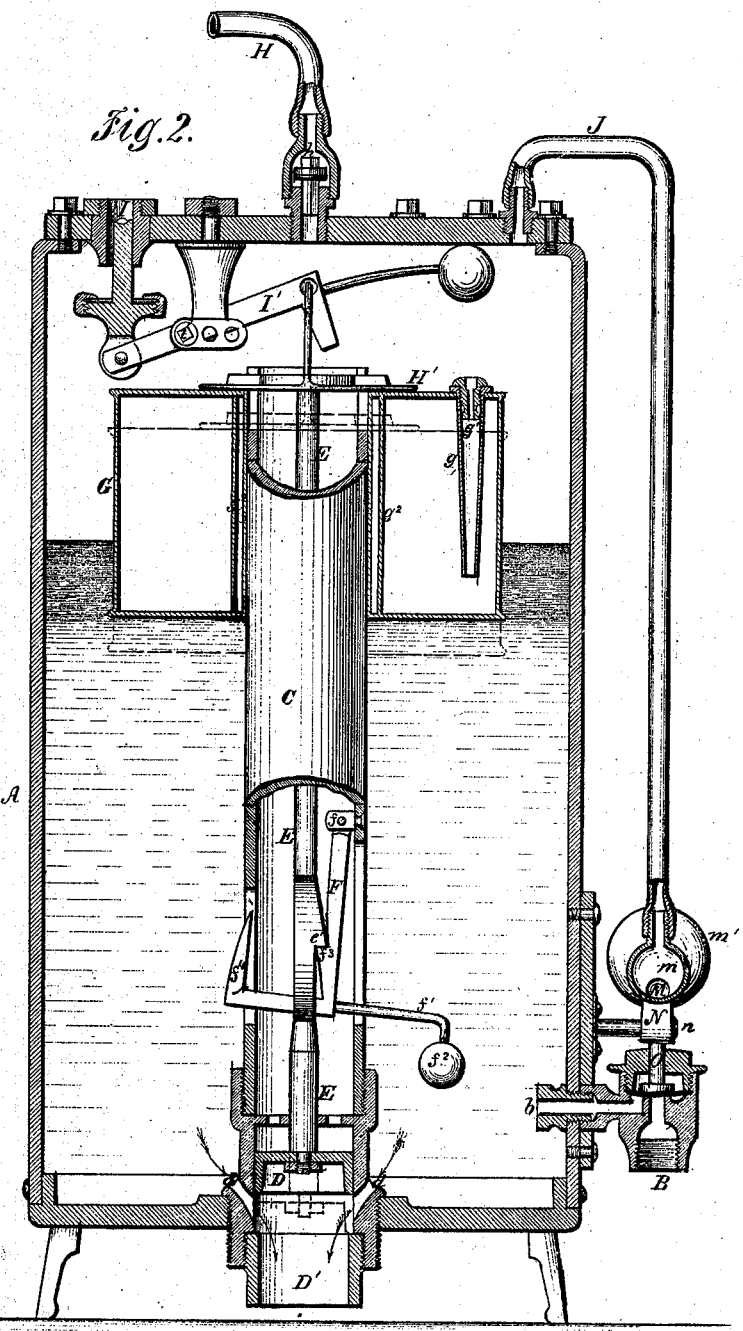

UNITED STATES PATENT OFFICE.

WILLIAM DENHAM SEAL, OF WASHINGTON, D. C., ASSIGNOR TO HIMSELF AND EDMUND SAYRE, OF SAME PLACE.

IMPROVEMENT IN HYDRAULIC AIR-COMPRESSING APPARATUS.

Specification forming part of Letters Patent No. 104,362, dated June 14, 1870.

*To all whom it may concern:*

Be it known that I, WILLIAM DENHAM SEAL, of Washington city, in the District of Columbia, have invented a certain new and useful Apparatus for Compressing Air by Hydraulic Pressure, of which the following is a full, clear, and exact description.

The object of my invention is automatically to compress air in a suitable chamber or receptacle. The pressure thus obtained constitutes a source of power either by acting directly upon the surface of liquids or upon suitable pistons, as usual in this class of engines.

In order to carry out the objects of my invention I cause a stream of water to flow into a tight vessel inclosing a float, which rises with the water. The air is compressed in the vessel by the rising of the water. When the vessel is nearly full of water, the float opens an outlet-valve and permits the water to escape. The compressed air may be conducted into a reservoir and prevented from returning to the compresser by a suitable valve. When the water has nearly all run out of the vessel, the float strikes a trip, which closes the valve, and the water again rises.

I form a communication between the air-vessel and float, so as to fill the latter with compressed air, and thus increase its power of flotation, and I prevent the escape of this compressed air by a suitable valve in the float.

In order that the float may not have to open the escape-valve against the full pressure of the chamber, I provide means by which the float opens a valve and permits the compressed air to escape just before the water-outlet valve is opened.

In order to supply air to the vessel for compression, I so arrange the outlet-valve that it remains open until the water-discharge valve is closed—that is, as long as water flows from the vessel—and is then closed simultaneously with the water-waste valve.

I also provide for regulating the degree of compression of the air by an automatic device, which cuts off the supply of water when the maximum of pressure has been attained and lets the water on again when the pressure is diminished.

The accompanying drawing represents a convenient apparatus for carrying out the objects of my invention, and in which all my improvements are embodied. It is obvious, however, that some of the parts may be used without the others, and that their details of construction may be varied to some extent without departing from the spirit of my invention. In this instance I have shown an apparatus more especially designed for producing atmospheric pressure on beer-barrels and analogous vessels.

Figure 1 represents a vertical central section through my improved apparatus, with the parts in the attitude they assume just after the water-waste valve has closed and the water begun to rise; Fig. 2, a similar section, showing the attitude assumed by the several parts immediately after the water-waste valve has been opened; Fig. 3, a horizontal section through the apparatus at the line $x\,x$ of Fig. 1, looking downward; Fig. 4, a similar section of the line $y\,y$ of Fig. 1, looking downward; Fig. 5, a similar section at the line $z\,z$ of Fig. 1, looking downward; and Fig. 6, a view, in elevation, of the apparatus for regulating the pressure.

An air and water tight vessel, A, in this instance of cylindrical form, is properly secured in any suitable position. For heavy pressure I prefer to use a cylinder of metal; but when light pressures only are required, I contemplate using a cylinder of terra-cotta or earthenware, with metal heads or ends properly connected therewith. Water is introduced into this cylinder from any suitable reservoir through a supply-pipe, $b$, in this instance located at one side of the cylinder.

A tubular stand, casing, or pillar, C, is secured centrally in the cylinder, over the water-waste valve, Figs. 1, 2, and 6, which valve consists, by preference, of an annular slide, D, moving over a series of holes, $d$, leading from the cylinder into the waste-pipe D'. The slide is connected with a rod, E, capable of moving freely endwise in the tube or pillar C.

A tripping-lever, F, swings on a pivot, $f$, inside the pillar, and is bent so as to pass through a yoke in the rod E and to project through a slot in one side of the pillar. (See Figs. 1 and 2.) An arm, $f^1$, projects laterally from the tripping-lever, and carries a ball, $f^2$, the weight of which always keeps the toe $f^4$ protruded through the slot in the pillar unless forced in by the float. A notch, $f^3$, in this lever engages a catch, $e'$, on the yoke of the valve-rod E, to hold the water-waste valve open when required, as hereinafter explained.

An annular float, G, surrounds and moves freely up and down on the pillar C. In order to increase the buoyancy of this float I make it air-tight, and insert a pipe, $g$, in it. A valve, $g^1$, in this pipe opens inward, and thus permits air to enter the float, but prevents its escape. The float is thus kept full of air, compressed to the highest degree of pressure at any time existing in the cylinder. The inner walls, $g^2$, of the float are by preference made double, to prevent the escape of the compressed air by the wearing away of the casing next the pillar.

The upper end of the lifting-rod carries a ring or cross-head, E', Figs. 1, 2, and 3, which projects beyond the pillar. The water-waste valve is thus lifted as the water rises by the float bearing up these arms and the lifting-rod with them. When, however, the air in the cylinder is much compressed, the float might not be sufficiently buoyant to lift the valve. To meet this contingency I arrange a valve, I, (in this instance located on the cylinder-head,) to open inward. A weighted lever, I', connected with this valve, rocks on a fulcrum, $i$, which is made adjustable by varying the relative lengths of the different ends of the lever from the fulcrum by means of a series of holes, as in Fig. 2, or by a slot and set-screw. The valve may thus be made to open with very little power.

The valve might be placed outside the cylinder, but I prefer the arrangement herein shown.

In order to permit air to enter the cylinder as the water falls, the inner end of the lever I' is bent down so near to the top of the lifting-rod that, when that rod is lifted and held up by its catch, the air-valve is also opened and held open until the waste-valve is closed.

A pipe, H, provided with a valve, $h$, of any well-known construction, leads to an air-chamber, or, in this instance, is intended to be connected directly with the barrel on which pressure is required to be produced. Several barrels may be acted on simultaneously by a single pipe connected with each of them.

Another pipe, J, leads to an apparatus for regulating the degree to which the air is compressed in the cylinder, which apparatus is constructed as follows: The water-inlet pipe B is provided with a chamber, in which a flexible diaphragm, $o$, is so arranged as to cover the mouth of the pipe. A piston, O, rests on this diaphragm over the mouth of the inlet-pipe. A tube, W, connecting two hollow spheres, $m$ $m'$, is secured in a collar, N, in which it is adjustable endwise, and can be held by a set-screw in any desired position. The collar N rocks on a fulcrum, $n$.

The operation of my improved apparatus is as follows: Assuming the parts to occupy the relative positions shown in Fig. 1, and the water just turned on in the pipe B, there being now no pressure in the vessel A, the water-inlet valve $o$ opens, and the water flows into the vessel through the inlet $b$. As the water rises in this vessel the float G also rises. The air in the vessel is gradually compressed, and escapes through the pipe H to its appointed reservoir.

When the float strikes the ring H' the air-valve I is opened, and the compressed air remaining in the cylinder escapes. This escape reduces the pressure so rapidly that the float rises with a jerk and strikes the cross-arms of the rod E, thus jerking open the water-waste valve D and overcoming any tendency to stick in its seat. As soon as the notch $e'$ on the valve-rod rises above the catch $f^3$ on the lever F, that lever is thrown forward by the counterpoise and the catches engaged. The water-waste valve is thus held open. As the water escapes the float G falls with it, but the air-valve I remains opens as its lever rests on the cross-head of the rod E. Air is drawn into the cylinder through this valve as the water falls. The toe of the bent lever F now projects through a slot in the pillar C. As the float descends it slides over this projecting portion of the lever and shoves it inward, thus releasing the catch $f^3$, when the water-waste valve instantly closes. The air-valve I is also closed simultaneously. The waste-pipe is so much larger than the inlet-pipe that it is unnecessary to stop the influx of water. The float rests on the counterpoise of the lever F. The water begins to rise again, and the process above described is repeated.

The pressure gradually increases at each stroke. In order that it may not become so great as to strain the vessels, I fill the smaller bulb, $m$, of the pressure-gage with quicksilver. When the pressure rises this quicksilver is forced through the connecting-tube into the larger bulb, $m'$, and its weight closes the inlet-valve $o$, and thus stops the working of the apparatus. The pressure required to stop the supply of water may be varied by varying the relative distance of the bulbs from their fulcrum $n$. When the pressure falls the quicksilver flows back again into the bulk $m$, the water-inlet valve opens, and the apparatus recommences its operation.

When applied to beer-barrels, every time a glass is drawn from the barrel its place would be supplied with air from the cylinder. This gage could, of course, be dispensed with, and an ordinary safety-valve be used; but this plan would involve unnecessary working of the apparatus, which, by my improvement, only works when necessary.

I do not claim, broadly, compressing air by the rising of a column of water in a closed vessel.

What I claim as my invention, and desire to secure by Letters Patent, is—

1. The combination of the air-compressing vessel with a hollow air-tight float, having a communication with the air-space of the vessel, and a valve closing such communication to retain the compressed air in the float, substantially as set forth.

2. The combination of an air-compressing vessel, a casing inclosing devices for tripping the water-waste valve, and a float encircling the casing, substantially as set forth.

3. The combination of the air-compressing vessel with a float, which opens the water-waste valve by a direct lift and closes said valve by acting on tripping devices independent of the lifting devices, substantially as set forth.

4. The combination of the float, the valve-rod, and the bent lever F, all constructed for joint operation, as set forth.

5. The combination of the air-compressing vessel, the float, the tripping device for the air-escape valve, and the water-waste valve-rod, whereby the pressure is automatically relieved just before opening the water-waste valve, substantially as set forth.

6. The combination of the valve-rod, its catch-lever F, and the air-escape valve, whereby the air-valve is held open to act as an air-supply valve until the water-waste valve is closed, substantially as set forth.

7. The combination of the compression-chamber and the air-valve, which is automatically opened by the float to relieve the pressure by permitting the compressed air to escape from the vessel, remains open to admit air to the cylinder as the water falls, and closes simultaneously with the water-waste valve, as set forth.

8. The combination of the annular float, the tripping-lever F, and the weighted arm, which serves both as a rest for the float and a counterpoise to keep the lever in proper position, as set forth.

9. The combination of the air-compressing vessel, the water-inlet valve, and the pressure-gage for closing the valve when the proper degree of pressure is attained, substantially as set forth.

In testimony whereof I have hereunto subscribed my name.

WM. D. SEAL.

Witnesses:
    JOE I. PEYTON,
    BALTIS DE LONG.